United States Patent
Herman Winkelmolen

[19]

[11] Patent Number: 6,033,296
[45] Date of Patent: Mar. 7, 2000

[54] INSTALLATION FOR MAKING A CUT IN THE NECK OF SLAUGHTERED POULTRY

[75] Inventor: Antoine Jean Herman Winkelmolen, Shawnee, Kans.

[73] Assignee: Tieleman Food Equipment B.V., Netherlands

[21] Appl. No.: 09/249,446

[22] Filed: Feb. 12, 1999

Related U.S. Application Data

[62] Division of application No. PCT/NL97/00466, Aug. 14, 1997.

[51] Int. Cl.[7] .............................. A22C 21/00; A22C 21/06
[52] U.S. Cl. ................................ 452/63; 452/54; 452/120
[58] Field of Search ................................ 452/63, 65, 106, 452/108, 120, 54

[56] References Cited

U.S. PATENT DOCUMENTS

| | | |
|---|---|---|
| 2,828,506 | 4/1958 | O'Donnell . |
| 3,056,161 | 10/1962 | Zebarth . |
| 3,165,780 | 1/1965 | Kellersman et al. . |
| 3,668,738 | 6/1972 | Vertegaal . |
| 3,802,028 | 4/1974 | Scheier et al. . |
| 3,958,303 | 5/1976 | Scheier et al. . |
| 3,979,793 | 9/1976 | Hazenbroek . |
| 4,136,421 | 1/1979 | Scheier et al. . |
| 4,184,230 | 1/1980 | Fox et al. . |
| 4,249,285 | 2/1981 | Sheehan et al. . |
| 4,257,142 | 3/1981 | Hathorn et al. . |
| 4,265,001 | 5/1981 | Hathorn et al. . |
| 4,266,322 | 5/1981 | Van Mil . |
| 4,418,444 | 12/1983 | Meyn et al. . |
| 4,467,500 | 8/1984 | Olson . |
| 4,532,676 | 8/1985 | Simmons . |
| 4,550,473 | 11/1985 | Simmons . |
| 4,730,365 | 3/1988 | Simmons . |
| 4,894,885 | 1/1990 | Markert . |
| 5,299,976 | 4/1994 | Meyn . |
| 5,569,072 | 10/1996 | Tieleman et al. . |
| 5,816,904 | 10/1998 | Tieleman et al. . |
| 5,913,720 | 6/1999 | Scott et al. . |
| 5,938,517 | 8/1999 | Vineyard et al. ......................... 452/63 |

FOREIGN PATENT DOCUMENTS

| | | |
|---|---|---|
| 0 258 480 | 3/1988 | European Pat. Off. . |
| 0 432 317 | 6/1991 | European Pat. Off. . |
| WO 84/01690 | 5/1984 | WIPO . |
| WO 96/16553 | 6/1996 | WIPO . |

OTHER PUBLICATIONS

Meyn Turkey & Duck Processing Brochure Entitled "Neck-skin Slitter for Turkeys—Type NST".
Meyn Turkey & Duck Processing Brochure Entitled "Meyn Turkey & Duck Processing Flash".

*Primary Examiner*—Willis Little
*Attorney, Agent, or Firm*—Smith, Gambrell & Russell, LLP; Beveridge, DeGrandi, Weilacher & Young

[57] ABSTRACT

A cut is made in the neck of slaughtered poultry to permit access to a tool for removing the crop. The cut is made by an apparatus which includes a carousel for moving the poultry, arch-shaped tracks which have sections which are horizontal, upward-sloping and downward-sloping, and running wheels which move in the tracks to effect vertical movement of handling units and bird positioning units. Each handling unit includes a tilting arm which has a blade fitted at its upper end, a centering fork with two centering elements which contact opposite sides of the neck of a bird, and a running wheel at its lower end where the running wheel rides in a track. During movement of the running wheel on its track, the tilting arm is first tilted from its sloping non-operative position to a less sloping vertical position to center the neck of a bird and to bring the blade against the neckskin, and the arm then makes a downward movement to form a cut in the neck.

19 Claims, 5 Drawing Sheets

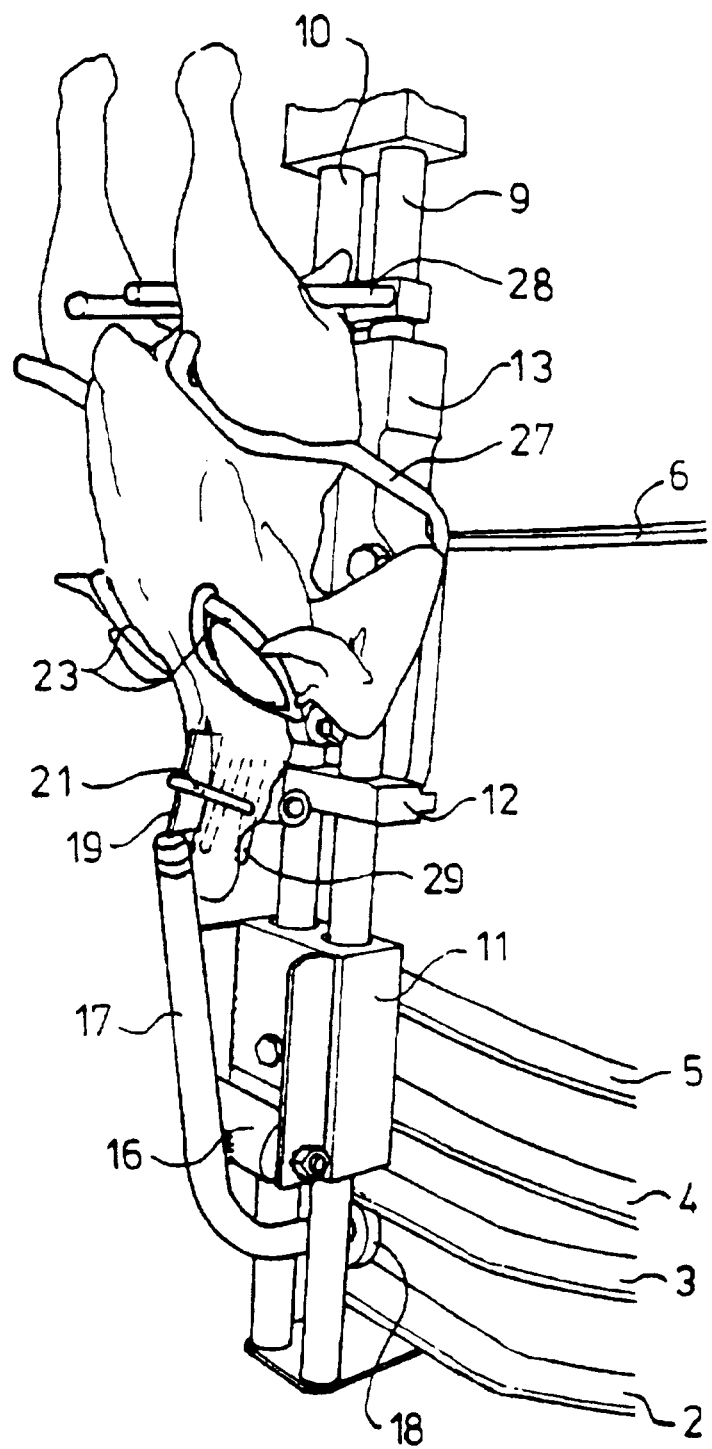

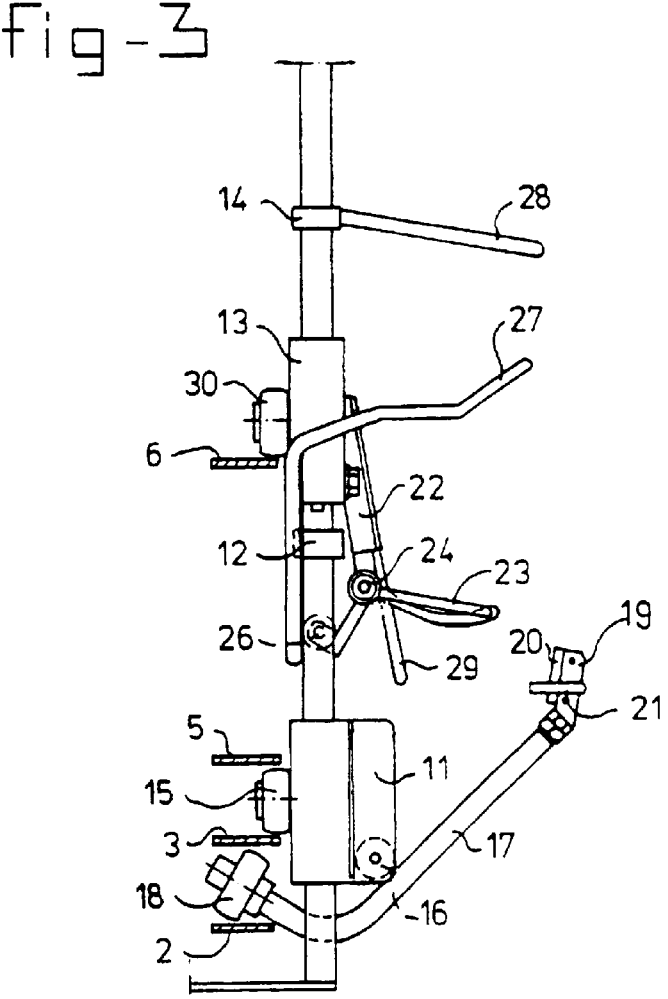
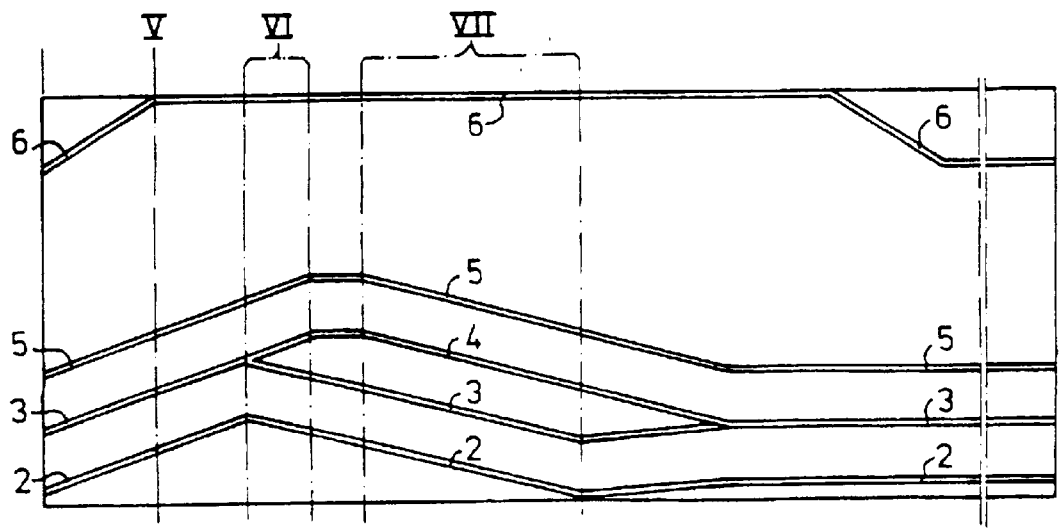

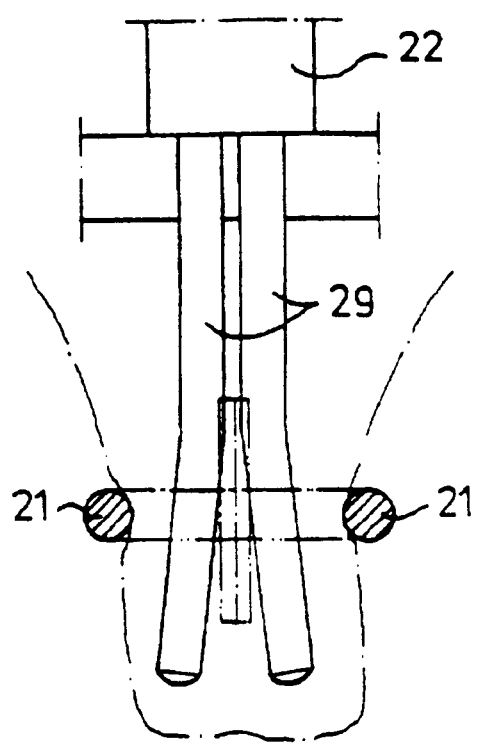
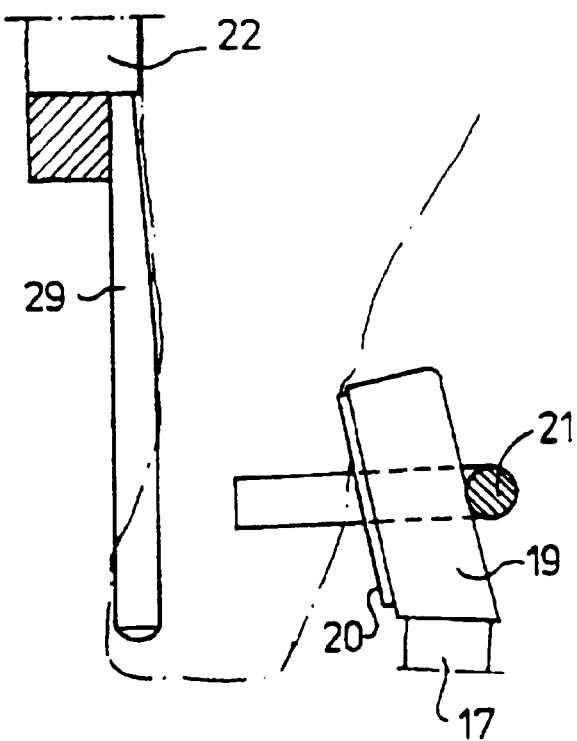

INSTALLATION FOR MAKING A CUT IN THE NECK OF SLAUGHTERED POULTRY

REFERENCE TO RELATED APPLICATION

This is a continuation of International Application PCT/NL97/00466, filed under the Patent Cooperation Treaty on Aug. 14, 1997, and identifying the United States as a designated country.

The invention relates to an installation for making a cut in the neck of slaughtered poultry, which cut permits access to a tool for removing the crop, comprising: a carousel for moving the poultry, arc-shaped tracks which have horizontal, ascending and descending section, and running wheels which can be moved on said tracks and are intended to effect a movement of at least one handling unit and at least one positioning unit.

It is important that the poultry carcass is held properly positioned during operations which are performed on said carcass. One of said operations is the removal of the crop, for which purpose it would be possible first to make a cut in the neck of the carcass before admitting a tool which removes the crop. The positioning of the neck must be so accurate that the risk of coming into contact with the crop when making the cut is restricted to a minimum.

The invention provides the solution to this problem.

According to the invention the installation mentioned in the preamble is, to this end, characterised in that the handling unit consists of a blade which is fitted at the top end of a tilting arm, which at its bottom end is provided with a running wheel which is movable on a track, means being present in order, while the running wheel is moving on its track, first to tilt the tilting arm from a sloping, non-operative position into a less sloping or vertical cutting position and then to cause the arm to make a downward movement.

Preferably, the tilting arm is mounted by means of a hinge on a first sliding block which, on rotation of the carousel, can be moved upwards and downwards along guide rods by means of a running wheel which is movable on a track, the tilting arm being tilted between the said non-operative position and the cutting position.

The poultry carcass can be positioned extremely accurately with respect to the blade in that both the running wheel of the tilting arm and the running wheel of the first sliding block have been positioned between two tracks.

Furthermore, a centring fork can be mounted on the top end of the tilting arm, which centring fork can bring the neck of the poultry into the correct position with respect to the blade.

Accurate positioning of the neck of the poultry is also associated with accurate positioning of the entire carcass. To this end two positioning spoons can be hingeably mounted, above the tilting arm carrying the blade, on a second sliding block, which can, on rotation of the carousel, be moved upwards and downwards along guide rods by means of a running wheel which is movable on a track, during which movement the spoons can hinge between a non-operative position and a position in which the breast of the poultry is pushed backwards.

For operation of the spoons, a projecting lever with a guide roller is fixed to each set of spoons, which guide roller is able on upward movement of the second sliding block, to come into contact with a stop and is thus able to cause the spoons to hinge into the operative position.

The positioning of the neck of the carcass can be carried out even more accurately if a non-tiltable or non-hingeable positioning element provided with an elongated cut-out, in particular a fixed fork, is also fixed to the second sliding block, which positioning element can interact with the centring fork to improve the positioning of the neck by said centring fork.

The carcass can easily and accurately be brought into the desired vertical position in the carousel if two hip lifting arms are mounted on the second sliding block above the said positioning spoons, which lifting arms are intended to rest beneath the feet of the poultry and, on upward movement of the second sliding block, to be able to bring the poultry into the desired position in the vertical direction.

To prevent the feet of the chicken moving towards one another, an essentially radially projecting fork in a fixed position can be mounted above the second sliding block, which fork is intended to extend between the feet of the poultry conveyed.

The invention will now be explained in more detail with reference to the figures.

FIG. 2 shows a perspective view of part of the carousel on a larger scale at the point in time when the cut is made.

FIG. 3 shows a side view of a mechanism for making a cut in the neck of a carcass.

FIG. 4 shows a view of roller tracks of the carousel in the opened out position.

FIG. 8 shows a front view of the fixed positioning fork and a cross-section through the centring fork.

FIG. 9 shows a side view of the unit according to FIG. 8.

Figure 1:
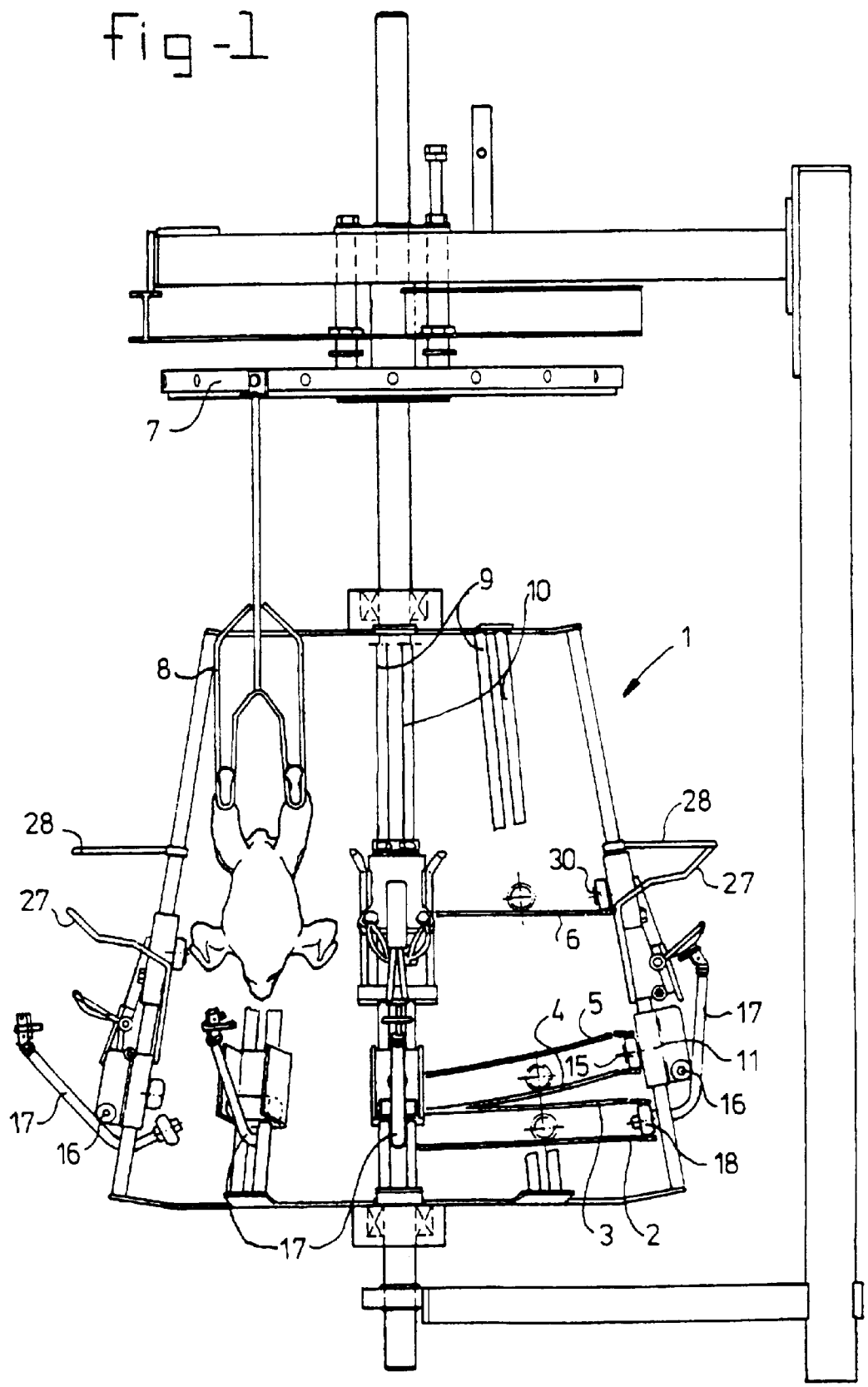
FIG. 1 shows a view of a carousel with facilities for accurately making a cut in the neck of a poultry carcass.

FIG. 1 shows a carousel 1, which can be made to rotate by drive means, which are not shown. A number of arc-shaped tracks which do not co-rotate with the carousel are arranged around the vertical axis of rotation of the carousel. Four of said tracks, 2, 3, 4 and 5 are shown in the figures. Additional tracks can be fitted for operations other than those discussed in this description. The only means shown are those for positioning the conveyed carcasses of chickens or other birds and making a cut in the neck thereof, via which cut a tool, which is not shown, can then penetrate into the neck of the chicken to remove the crop.

The chickens are supplied by a separate transport mechanism 7 with the aid of brackets 8, the legs of the chickens being oriented upwards. Pairs of upright guide rods 9, 10 are mounted on the rotary carousel and, viewed from bottom to top, a movable sliding block 11, a fixed stop 12, a movable second sliding block 13 and a fixed fixing element 14 are mounted on said rods.

The tracks 2 and 6 can be seen in the opened out position in FIG. 4. They have ascending, horizontal and descending sections. A track 4 branches off from track 3 and joins track 3 again some distance further on (seen towards the right in FIG. 4.).

The first sliding block 11 has a running wheel 15 which can roll between the tracks 3 and 5 in the first section of the movement path and between tracks 4 and 5 in the second section of the movement path.

An essentially L-shaped tilting arm 17 is attached to the first sliding block 11 by means of a hinge 16, which tilting arm is provided at its bottom end with a running wheel 18 which is able to roll between tracks 2 and 3. A blade holder 19 with blade 20 is fixed to the top end of the tilting arm 17 and a centring fork 21 is arranged around this combination.

A fixed arm 22, on which two positioning spoons 23 are mounted by means of a hinge 24, is attached to the second sliding block 13. A lever 25, which has a roller 26 at the bottom end, is attached to the spoons.

Two hip lifting arms 27 are rigidly connected to the second sliding block 13 and are guided by the rearmost part of the fixed stop 12.

The second sliding block 13 is movable by means of a running wheel 30 on track 6. Two projecting positioning rods 28 are mounted on the fixed fixing element 14.

A downward-pointing fork 29 is also fixed to the fixed arm 22 of the sliding block 13 (see also FIGS. 8 and 9).

The installing described functions as follows: a chicken carcass conveyed by a bracket 8 is introduced by its legs between a set of positioning rods 28. On further rotation of the carousel, the running wheels 30, 15 and 18 will roll on an upward slope over the tracks 6, 3 and 2, respectively. The upward-moving roller 30 causes the second sliding block 13 to slide upwards along a set of guide rods 9, 10. During this operation the hip lifting arms 27 come into position at the hips beneath the upper legs of the chicken and push the chicken upwards until the positioning rods 28 are resting on the thighs of the chicken. The chicken has now been brought into position at a desired height. This situation corresponds to that shown by V in FIG. 4. At the same time, the roller 26 has come into contact with the stop 12, as a result of which the lever 25 has moved from the position shown in FIG. 3 about the hinge spindle 24 into the position shown in FIG. 5 and the spoons 23 have been rotated upwards, pushing the breast of the chicken backwards as they rotate, as can be seen from the broken lines in FIG. 5. This situation is also indicated by V in FIG. 4.

The chicken is now in the desired position, both in the vertical and in the radial direction.

Figure 6:
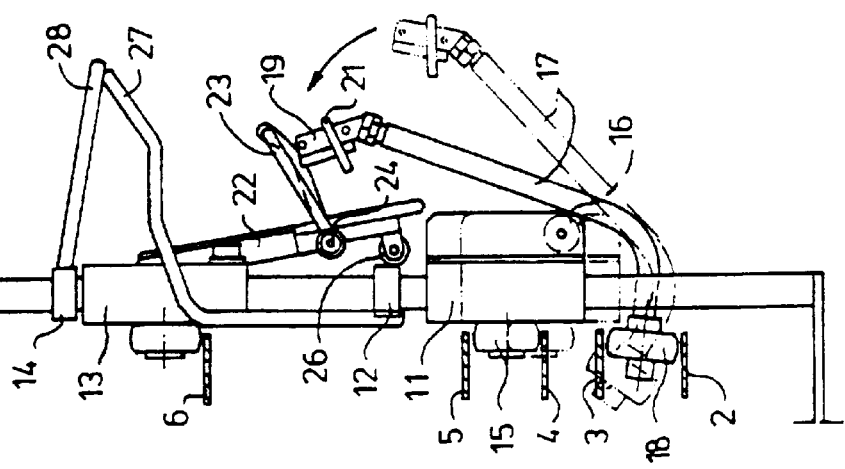
Figure 5:
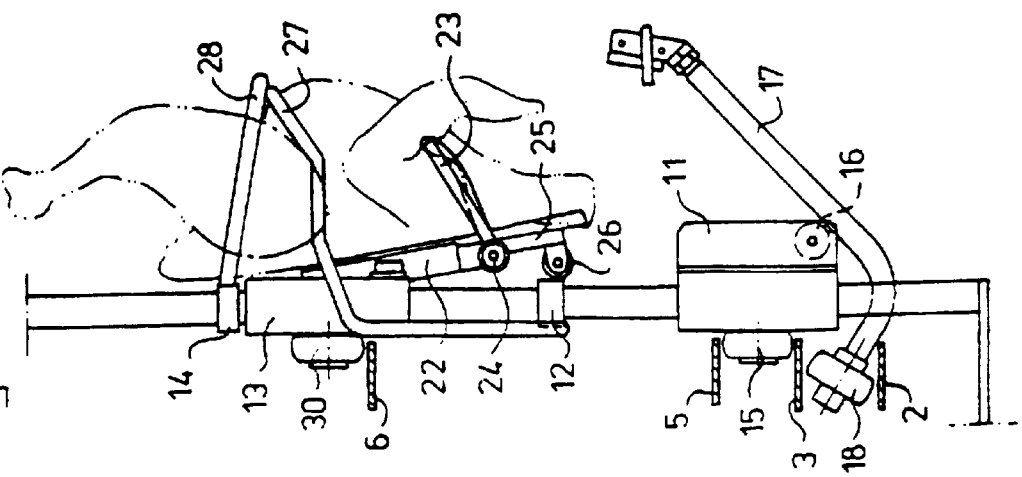

In the interim the running wheels 18 and 15 have rolled upwards over their tracks 2 and 3 into the position according to FIG. 5. On further rotation of the carousel, the running wheels 18 and 15 will first roll further upwards and reach the position furthest to the left in the positioning range VI in FIG. 4. The running wheels 18 then start their sloping descending movement, whilst the running wheels 15, and thus the sliding block 11, continue to move on an upward slope until the position at the far right of the positioning range VI has been reached. In FIG. 6 the tilting arm 17 is shown in the far left position of the range VI by dot-and-dash lines and in the far right position of the range VI by continuous lines.

Figure 7:
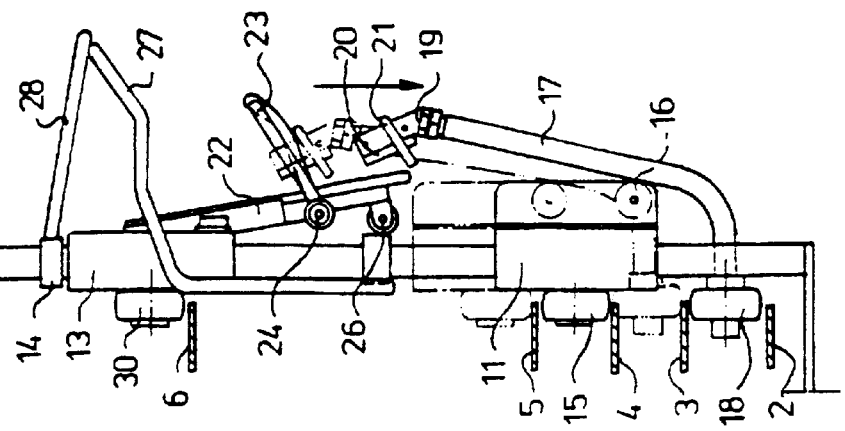
FIGS. 5, 6 and 7 show successive stages in making the cut.

After the sliding block 11 has traversed a short horizontal path (between VI and VII in FIG. 4) and the roller 18 of the tilting arm 17 has moved further downwards at a slope, the sliding block 11 with the tilting arm 17 also moves downwards in accordance with a path from the left-hand side of range VII to the right-hand side of said range. The result can be seen in FIG. 7: first of all the blade 20 and the centring fork 21 approach the fixed fork 29, the neck of the chicken being forced by the centring fork 21 into the gap between the prongs of the fixed fork 29 and thus being brought into the desired accurate position, and the blade penetrates into the neck of the chicken (FIG. 2) and the blade is then moved downwards (see the arrow in FIG. 7) to extend the incision made in the neck of the chicken (position shown by continuous lines in FIG. 7).

The further course of the movement can be seen from FIG. 4: the tilting arm 17 gradually tilts back into the starting position according to FIG. 5.

By successively bringing the chicken, with the aid of the hip lifting arms 27 and the positioning rods 28, into the desired position for handling, then bringing the neck of the chicken into the desired accurate position by means of the centring fork 21 and the fixed fork 29, the blade 20 can make an accurate cut and extend the latter downwards to the desired size.

The risk of the blade coming into contact with the crop has fallen to a minimum.

After making the cut in the neck, the chickens are transported with the aid of the brackets 8 to a following carousel, where the crop is removed via the cut in the necks of the chickens with the aid of special tools.

A plate with an elongated cut-out can also be used instead of the fixed fork 29.

The object of the invention is to make the cut in the neck of the chickens. Other mechanisms for positioning the chickens are also possible.

I claim:

1. Apparatus for making a cut in the neck of slaughtered poultry to provide access for a tool for removing the crop, said apparatus comprising: a carousel which includes at least one poultry positioning unit and at least one handling unit for cutting the neck of slaughtered poultry held on said positioning unit, said handling unit including a cutting blade which is fitted on a tilting arm, arc-shaped tracks which have horizontal, ascending and descending sections, running wheels which are movable on said tracks to cause movement of said handling unit and said positioning unit, said tilting arm having a said running wheel which is movable on said track, said tracks being operable to move said tilting arm from a non-operative position to a cutting position and then to impart a downward movement to said arm when it is in said cutting position, a centering fork mounted on said tilting arm, said centering fork having two centering elements which contact opposite sides of the neck of the poultry when the tilting arm is in its cutting position to position the neck in a correct position relative to the blade.

2. Apparatus according to claim 1, wherein said carousel includes guide rods, said handling unit including a first sliding block provided with a running wheel which moves on a said track to move said first sliding block up and down along said guide rods, said tilting arm being mounted on said first sliding block by a hinge and being tilted on said hinge between said non-operative position and said cutting position.

3. Apparatus according to claim 1 in which said centering fork is immovable relative to said tilting arm.

4. Apparatus according to claim 1 including a positioning element provided with an elongated cut-out, said positioning element being operable to engage the neck and to interact with the centering fork to improve the positioning of the neck of the poultry by said centering fork.

5. Apparatus according to claim 4 in which said cut-out extends entirely through said positioning element.

6. Apparatus according to claim 4, wherein said centering elements extend on opposite sides of said positioning element when said tilting arm is in its cutting position.

7. Apparatus according to claim 1 including a positioning element provided with an elongated cut-out, said positioning element and said cutting blade being positioned to engage opposite surfaces of the neck.

8. Apparatus according to claim 1, wherein essentially radially projecting elements are provided to extend between the feet of the poultry conveyed.

9. Apparatus for making a cut in the neck of slaughtered poultry to provide access for a tool for removing the crop, said apparatus comprising: at least one poultry handling unit including a cutting blade which is fitted on a tilting arm, said tilting arm being movable from a non-operative position to a cutting position, said tilting arm being movable downwardly when it is in said cutting position, two centering elements mounted on said tilting arm for contacting opposite sides of the neck of the poultry when the tilting arm is in its cutting position to position the neck in a correct position relative to the blade.

10. Apparatus according to claim 9, including a carousel which has guide rods, tracks which have horizontal, ascending and descending sections, said handling unit including a first sliding block provided with a running wheel which moves on a said track to move said first sliding block up and down along said guide rods, said tilting arm being mounted on said first sliding block by a hinge and being tilted on said hinge between said non-operative position and said cutting position.

11. Apparatus according to claim 9 in which said centering elements are immovable relative to said tilting arm.

12. Apparatus according to claim 9 including a positioning element provided with an elongated cut-out, said positioning element being operable to engage the neck and to interact with the centering elements to improve the positioning of the neck of the poultry by said centering elements.

13. Apparatus according to claim 12 in which said cut-out extends entirely through said positioning element.

14. Apparatus according to claim 12, wherein said centering elements extend on opposite sides of said positioning element when said tilting arm is in its cutting position.

15. Apparatus according to claim 9 including a positioning element provided with an elongated cut-out, said positioning element and said cutting blade being positioned to engage opposite surfaces of the neck.

16. A method of making a cut in the neck of slaughtered poultry comprising the steps of:

positioning the poultry on a rotating carousel of a poultry processing machine which has a cutting blade and a neck-engaging device which are mounted on a tiltable arm which is movable between a non-operative position and an operative position;

moving said arm from its non-operative position to its operative position to move the cutting blade into cutting contact with said neck and to move the neck engaging device into contact with opposite sides of said neck in a region of the neck which is below the cutting blade;

moving the arm down relative to the poultry while said neck engaging device is in contact with opposite sides of said neck and said blade is in cutting contact with said neck, thereby forming a cut in the neck; and, moving said arm from its operative position to its non-operative position.

17. A method according to claim 16 in which the neck engaging device is maintained at a stationary position relative to said arm.

18. A method according to claim 16 wherein, when the arm moves down, a positioning element is in contact with a surface of the neck which is opposite to said blade.

19. A method according to claim 16 wherein, when the arm moves down, the neck engaging device moves down relative to the positioning element.

\* \* \* \* \*